United States Patent [19]

Müller et al.

[11] Patent Number: 4,501,170
[45] Date of Patent: Feb. 26, 1985

[54] METHOD OF CONTROLLING DOWNSHIFT AFTER BRAKING IN AUTOMATIC TRANSMISSIONS OF MOTOR VEHICLES

[75] Inventors: Alfred Müller, Gröbenzell; Dieter Schaller, Neubulach; Manfred Schwab, Gerlingen, all of Fed. Rep. of Germany

[73] Assignee: Robert Bosch GmbH, Stuttgart, Fed. Rep. of Germany

[21] Appl. No.: 391,171

[22] Filed: Jun. 23, 1982

[30] Foreign Application Priority Data

Jul. 15, 1981 [DE] Fed. Rep. of Germany ....... 3127931
Oct. 8, 1981 [DE] Fed. Rep. of Germany ....... 3139985

[51] Int. Cl.³ ............................................. B60K 41/06
[52] U.S. Cl. ..................................... 74/866; 74/856
[58] Field of Search ................. 74/843, 856, 861–866; 364/424.1

[56] References Cited

U.S. PATENT DOCUMENTS

| | | | |
|---|---|---|---|
| 3,628,642 | 12/1971 | Ravenel | 74/866 X |
| 3,776,048 | 12/1973 | Enomoto et al. | 74/866 |
| 3,881,368 | 5/1975 | Furuhashi et al. | 74/866 |
| 3,918,312 | 11/1975 | Espenschied et al. | 74/866 X |
| 3,974,720 | 8/1976 | Iijima | 74/866 |
| 4,039,061 | 8/1977 | Pruvot et al. | 74/866 X |
| 4,226,295 | 10/1980 | Rembold et al. | 74/866 X |
| 4,258,591 | 3/1981 | Eckert et al. | 74/866 |
| 4,267,750 | 5/1981 | Espenschied et al. | 74/866 |
| 4,318,312 | 3/1982 | Morimoto et al. | 74/866 |
| 4,319,501 | 3/1982 | Sugimoto | 74/866 |
| 4,338,666 | 7/1982 | Suzuki et al. | 74/866 X |
| 4,353,272 | 10/1982 | Schneider et al. | 74/866 X |

FOREIGN PATENT DOCUMENTS 1529480 10/1978 United Kingdom ................ 74/866

Primary Examiner—Leslie A. Braun
Assistant Examiner—Dwight G. Diehl
Attorney, Agent, or Firm—Frishauf, Holtz, Goodman & Woodward

[57] ABSTRACT

After the gear ratio of an automatic transmission has been increased in response to a braking operation the return to normal operation of the automatic transmission is controlled by logic circuits interconnecting threshold switches operated by the brake pedal and the accelerator pedal and by a read-only memory that stores a maximum engine speed for all values of vehicle speed so that the higher gear ratio is maintained until either the brake is released or the maximum engine speed is exceeded and then the return to normal transmission operation is further delayed until the accelerator pedal is again actuated. In one method, during the period of further delay the gear ratio continues at its raised value. In another embodiment the period of further delay begins with storage of the vehicle speed at the moment and proceeds with control of the transmission to maintain that speed. It is also possible to operate the system so as not to restore normal operation of the transmission after braking when there is only a slight depression of the accelerator pedal.

4 Claims, 4 Drawing Figures

METHOD OF CONTROLLING DOWNSHIFT AFTER BRAKING IN AUTOMATIC TRANSMISSIONS OF MOTOR VEHICLES

This invention concerns a method of controlling an automatic transmission of a motor vehicle which has been downshifted, which is to say that its gear reduction ratio has been increased, in response to the operation of the brake pedal of the vehicle, in order to restore a normal gear ratio at an appropriate time.

Automatic transmissions operating stepwise from one gear ratio to another are known in which the operation of the brake pedal modifies the switchover point of the basic shift pattern of transmission control. In this manner the result is obtained that upon actuation of the brake pedal an increased braking effect of the motor can be utilized because an upshift is suppressed or the transmission is actually shifted down. Such a system is described in published German patent application (AS) No. 19 54 757. This known system has the disadvantage, however, that strictly in dependence upon the actuation of the brake pedal a fixed changeover of the shift pattern is put into effect, so that the duration and thereby the intensity of the brake pedal actuation has no further effect thereafter and, moreover, the reaction of the motor is insufficiently taken into account. Furthermore, in that system the fact is also neglected that in general the increased braking effect ought to be maintained after the brake pedal is released so long as the accelerator pedal ("gas" pedal) is not again actuated.

THE INVENTION

It is an object of the invention to improve the criteria for restoration of the normal gear shift pattern of an automatic transmission after it has been altered in response to braking by taking better account of the further actuation of the brakes and of the motor speed reaction and by taking account of the next actuation of the accelerator pedal.

Briefly, the gear shift pattern providing raised gear ratios after braking is maintained for a first period of time which lasts until either the brake control has been released or else the speed of the motor of the vehicle exceeds a speed value specified by a predetermined characteristic curve with reference to the transmission output speed, and when either of these conditions is satisfied the same gear ratio continued for a second period of time, but in another embodiment for the second period of time the transmission is put on a control tending to prevent the vehicle speed from changing. The second period ends when the accelerated pedal is again actuated.

The method of the invention has the advantage that the duration of brake actuation and thereby the intensity of the desired braking is taken along into account, that racing of the motor is safely prevented and that the increased motor braking effect is maintained until renewed actuation of the accelerator pedal. The invention is also applicable to stepless automatic transmissions.

As a further refinement by determination of a narrow region of slight accelerator pedal depression it can be provided that the motor braking effect will be maintained at least to some extent after a braking operation in spite of renewed actuation of the accelerator pedal so long as that renewed actuation is only slight.

THE DRAWINGS

The invention is further described by way of illustrative example with reference to the annexed drawings, in which:

FIG. 3b is a diagram for explanation of the operation of the hysteresis switch shown in FIG. 3a.

DESRIPTION OF THE ILLUSTRATED EMBODIMENT

Figure 1:
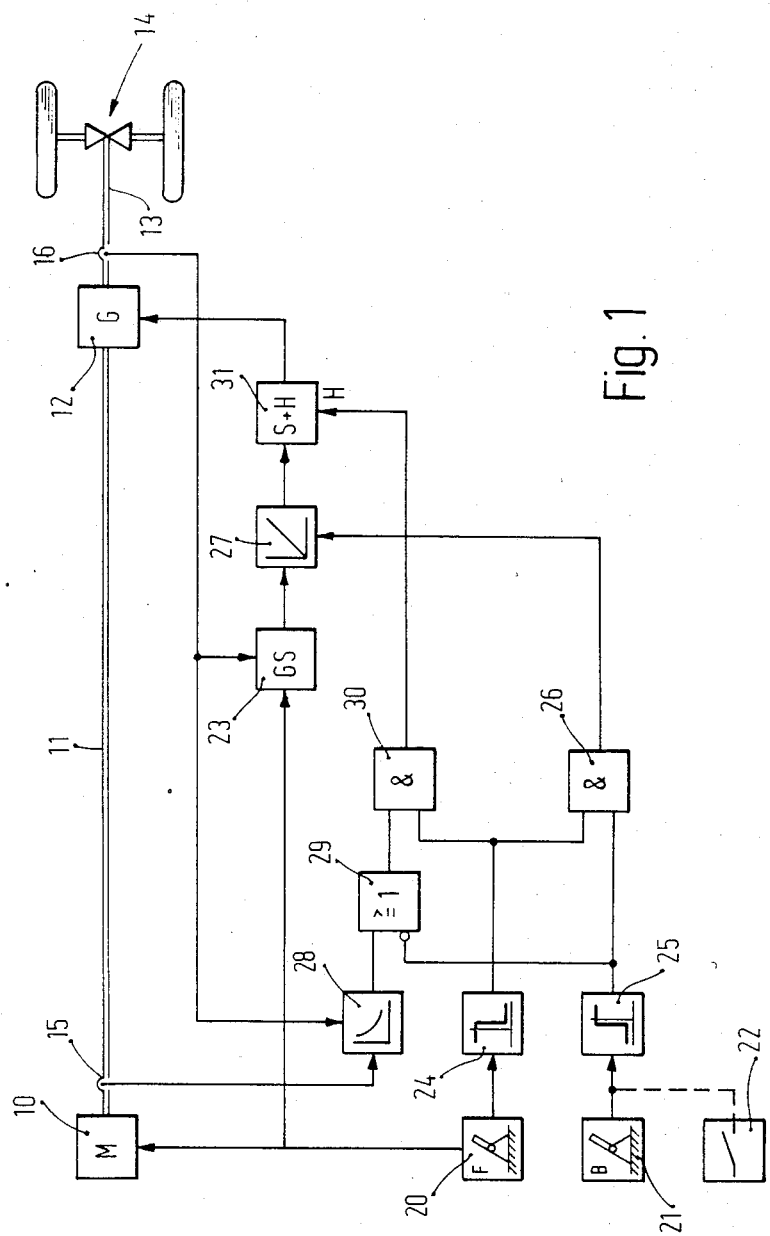
FIG. 1 is a circuit block diagram of a first embodiment of apparatus for carrying out the method of the invention.

FIG. 1 shows a motor 10 of a motor vehicle that is connected to an automatic transmission 12 by means of a drive shaft 11, while the automatic transmission has an output shaft 13 that is connected to the differential gear 14 for driving the wheels of the vehicle. At the respective outputs of the motor 10 and of the transmission 12 are provided a motor speed transducer 15 and a transmission output speed transducer 16, both of which produce electrical signals corresponding to the speeds which they measure.

For control of the automatic transmission 12 there are provided an accelerator pedal (or "drive" pedal) 20 and a brake pedal 21 which have an effect, yet to be described, modifying the output of a transmission control unit 23. The accelerator pedal 20 is on the one hand connected in the known way with the motor 10 and with the transmission control unit 23 and on the other hand is in this case connected to a threshold switch 24 which provides a positive logic output signal when it is released or approximately released and a logic signal zero when it is pushed appreciably out of its released position.

The brake pedal 21, in addition to its usual function of controlling the braking system of the motor vehicle is connected to a threshold switch 25. The latter is connected inversely to the manner of connection of the threshold switch 24, which is to say that when the brake pedal is in nonactuated condition, the output of the threshold switch is a zero logic signal and when the brake pedal 21 is actuated a positive output signal of the threshold switch 25 is produced. It is understood that the function of the brake pedal 21 so far as it is of interest here can also be represented by a switch 22, so that the method of the invention described below can also be controlled purely manually, in case it should be desired that the motor braking effect should be separately controllable by hand.

The output signals of the threshold switches 24 and 25 are correlated by an AND gate 26 through the respective inputs of which they are connected. The output of the AND gate 26 is furnished to a gear ratio control 27 that is arranged to follow (receive an output from) the transmission control unit 23. The effect of the signal from the AND gate 26 is such that a positive output signal so modifies or overrides the output signal of the transmission control unit 23 that in the transmission 12 an increase of the reduction gear ratio is produced over the ratio that is normally produced in dependence upon the position of the accelerator pedal 20 and upon the output signal of the transmission output speed transducer 16.

A characteristic curve storage device 28 is also provided to which the signals of the motor speed transducer 15 and the transmission output speed transducer 16 are supplied. The storage device 28, which may include a read-only memory, stores a characteristic curve specifying the maximum motor speed as a quantity dependent upon transmission output speed (which has a fixed relation to vehicle speed). If the actual motor speed exceeds the speed prescribed in the characteristic curve store 28, and OR-gate 29 is given an output by a comparator in the characteristic curve store 28. The other input of the OR-gate 29 is an inverting input which is connected to the output of the threshold switch 25. The output of the OR-gate 29 is correlated with the output of the threshold switch 24 by an AND-gate 30 to the respective inputs of which these outputs are furnished. The output of the AND-gate 30 controls a sample and hold circuit 31 that is interposed between the gear ratio control 27 and the transmission 12.

A first embodiment of the method of the invention can now be described with reference to the apparatus of FIG. 1 as follows.

In normal driving the overall gear ratio of the transmission 12 is determined by the transmission control unit 23 in dependence upon the deviation from rest position of the accelerator pedal 20 (motor load information) and the output signal of the transmission output speed transducer 16 (vehicle speed information). It is to be understood in this connection that other known kinds of control can also be used for the transmission control unit 23 and that, in particular, the motor load information can be provided in some manner other than from the position of the accelerator pedal 20, for example from the position of the throttle valve, of a fuel injection pump controller, or the like.

If now the accelerator pedal 20 is released and the brake pedal is actuated, positive signals appear at the respective outputs of the threshold switches 24 and 25 and the AND gate 26 is caused to provide a positive signal. The latter produces a response of the gear ratio control 27 with the effect that the gear ratio of the transmission 12 is raised. In consequence an increase of the motor speed is produced and with that an increased motor braking effect. At the same time one input of the AND-gate 30 goes positive with the output of the threshold switch 24. The AND-gate 30 will then pass a positive signal as soon as it receives a positive signal at its other input. That takes place either if the brake is released (inverting input of the OR-gate 29) or if the motor speed which is prescribed by the characteristic curve store 28 is exceeded (noninverting input of the OR-gate). Therefore, as soon as one of these two conditions is satisfied, i.e. either the brake pedal is released or the motor runs too fast, a first period of the method of the invention terminates as the AND-gate 30 responds and the transmission gear ratio presently in effect prescribed by the gear ratio control 27 is fixed in the sample and hold circuit 31. This maintaining of the gear ratio is now continued only until the AND-gate 30 is again blocked by a zero signal from the threshold switch 24 which is the case when the accelerator pedal 20 is deviated by an amount set by the threshold switch 24, which may mean any deviation at all or a deviation having at least a predetermined minimum value. This means that after a further operation of the accelerator pedal 20 both the gear ratio control 27 and also the sample and hold stage 31 go out of operation, terminating a second period of the method with the restoration of a normal operation for the transmission 12 that depends upon the above-mentioned vehicle operation parameters.

Figure 2:
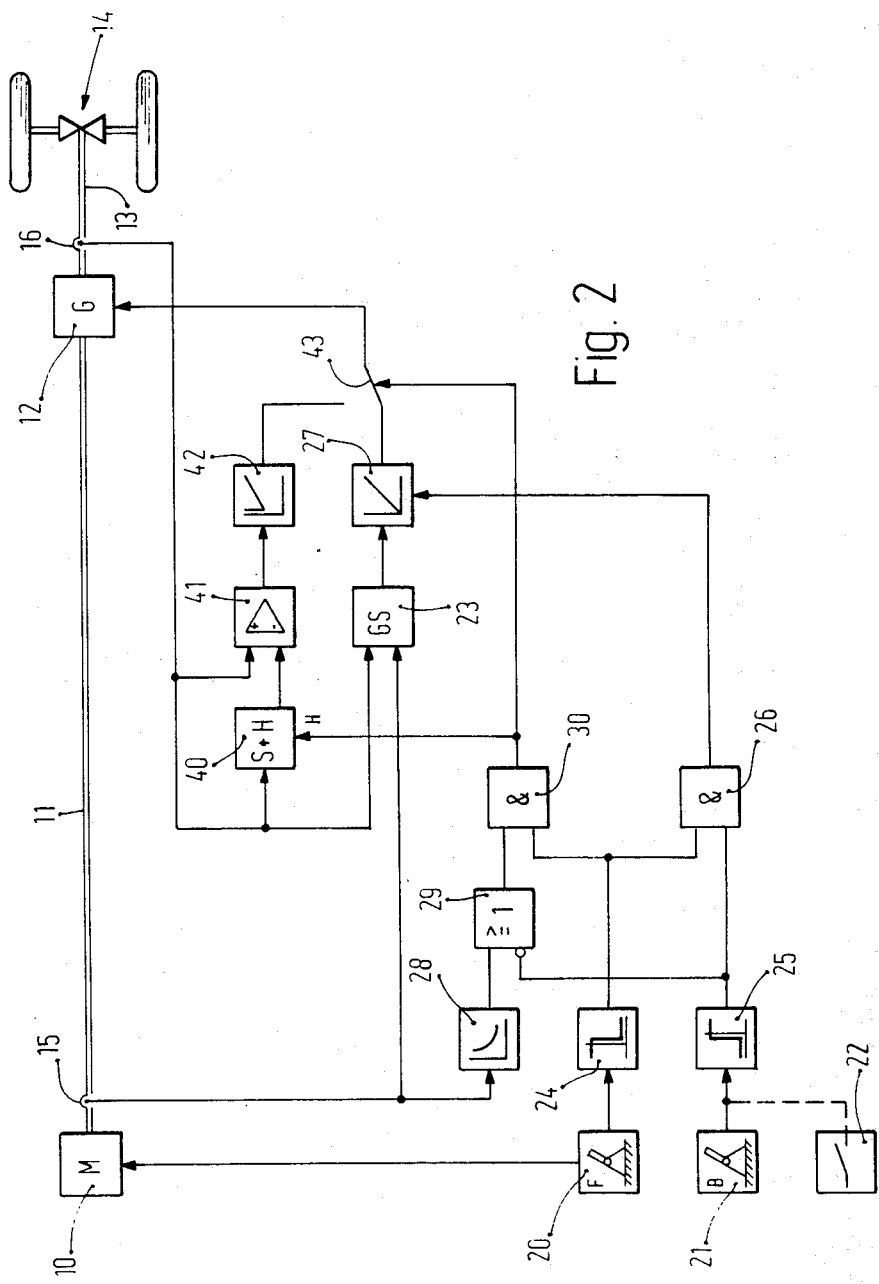
FIG. 2 is a circuit block diagram of a second embodiment of apparatus for performance of the method of the invention.

The apparatus shown in FIG. 2 for carrying out a method according to the invention is to a great extent constituted in the same way as that of FIG. 1, with the result that the same reference numerals are utilized for corresponding components. A difference from the arrangement of FIG. 1 is the provision of a sample and hold stage 40 which is activated by the signal of the transmission output speed transfer 16 and which has its hold input also connected with the output of the AND-gate 30. The AND-gate 30 at the same time controls a transfer switch 43 by which the control input of the transmission 12 can be shifted from the gear ratio control 27 to the output of a chain of circuits following the sample and hold stage 40, namely a comparator 41 and a controller 42, connected in that order of succession. The comparator 41 has its other input connected to the output of the transmission output speed transducer 16.

Another embodiment of method according to the invention will now be described with reference to FIG. 2.

Figure 3A:
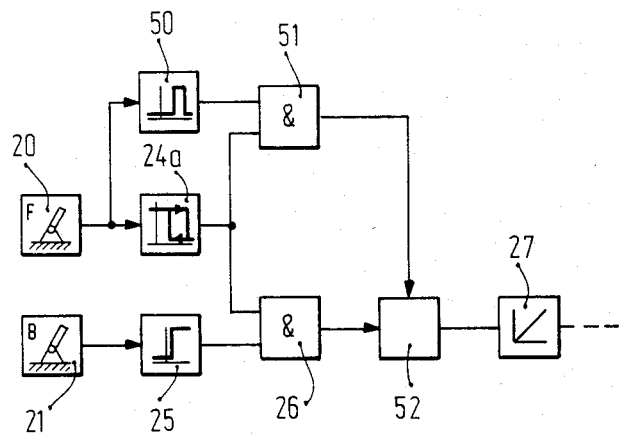
FIG. 3a is a modification of a portion of the circuit diagrams of FIGS. 1 and 2 making use of the definition of a narrow range of slight actuation of the accelerator pedal.

As in the above-described first embodiment of the method, when the accelerator pedal 20 is released and the brake pedal 21 then actuated, the AND-gate 26 provides a signal which causes the gear ratio control 27 to porduce an increase of the gear ratio of the transmission 12, because at this moment the transfer switch 43 is in the position shown in FIG. 2. If now the brake pedal 21 is again released or if the motor speed exceeds the speed prescribed by the characteristic curve store 28, the transfer switch 43 is switched over as the result of operation of the OR-gate 29 and the AND-gate 30 and at the same time the momentary value of the signal of the transmission output speed transducer 16, corresponding to the vehicle speed, is stored in the sample and hold stage 40. This momentary value of vehicle speed is compared with the actual vehicle speed in comparator 41 and the difference signal is provided to a controller 42. The latter, in dependence upon the speed error signal causes the transmission 12 to have its operation modified in a manner tending to keep the vehicle speed at the value which it had at the moment of the switching over of the transfer switch 43, i.e., so that the output signal of the comparator 41 is brought to zero. By this procedure there is produced, overall, upon the initiation of a braking action, first a rapid increase of motor speed at constant vehicle speed, but if the motor speed starts to overstep the prescribed maximum motor speed, the now high braking effect of the motor remains available for the braking operation and thereby for the reducing of the vehicle speed. In the previously described method according to the invention the driver has a choice only between operation with high braking effects and the normal driving program with very little effect. In order to extend the scope of the method of the invention a modified method can be used which is described below with reference to the circuit shown in FIG. 3a and the diagram given in FIG. 3b.

Figure 3B:
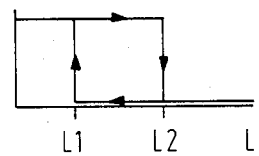

In this case the accelerator pedal 20 instead of being connected to a simple threshold switch 24 is connected to a hysteresis threshold switch 24a. In parallel thereto the output signal of the accelerator pedal 20 is supplied to a signal zone switch 50 which provides a positive output signal whenever the input signal is within a narrow range of value, this range having the same coverage as the hysteresis width of the hysteresis threshold switch 24a. The respective outputs signals of the signal zone switch 50 and the hysteresis threshold switch 24a are correlated in another AND-gate 51 to the respective inputs of which these output signals are provided. The output of the AND-gate 51 is supplied to the control input of an offset stage 52 that is interposed between the AND-gate 26 and the gear ratio control circuit 27. The hysteresis threshold switch 24a has a characteristic curve which is illustrated in FIG. 3b. While the accelerator pedal 20 is released a positive output signal is produced that is maintained until the accelerator pedal 20 is deviated beyond the load value L2, after which a zero output signal is produced. If now the accelerator pedal 20 is released again, the hysteresis threshold switch 24a provides a positive output signal only when the load value represented by the accelerator pedal 20 has gone down below the value L1, which is a value substantially lower than L2. As a result there is a region of slight accelerator pedal depression, namely between L1 and L2 in which it could be expected that the driver still desires a certain limited braking effect to be supplied by the motor.

For the extended method according to the invention there is at first no change, since while the accelerator pedal 20 is released the signal zone switch 50 provides a zero output signal and the AND-gate 51 is accordingly blocked, so that the offset stage 52 is out of action. In consequence the signal at the AND-gate 26 is passed on unchanged to the gear-ratio control circuit 27. If now, with the brake pedal 21 released and the AND-gate 26 accordingly blocked, the accelerator pedal 20 is pressed again, the positive output signal of the hysteresis threshold switch 24a remains until the load value L2 is reached. In the region between L1 and L2, however, the AND-gate 51 responds, so that the offset stage 52 is activated in this signal range and permits, through the gear ratio control circuit 27 a reduction of the gear ratio of the transmission 12 only by a limited amount. Only when the accelerator pedal 20 is again pressed beyond the value L2 will the AND-gate 51 be brought again by the signal zone switch 50. When that happens the transmission 12 is restored to the normal operation of an automatic stepwise transmission.

The above-described methods of the invention can be applied with particular advantage when the transmission 12 is a steplessly shiftable transmission, since then a quasicontinuous control is possible and the gear ratio can alway be shifted just so far as is required by current driving conditions and desired by the preferences of the driver.

It is therefore to be understood that although the invention has been described with reference to particular illustrative examples, variations and modifications are possible within the inventive concept.

We claim:

1. Method of controlling an automatic transmission of a motor vehicle with respect to operation of the vehicle brake control in which the gear ratio of the transmission is raised to improve braking, comprising the steps of:
    raising the gear step-down ratio of the transmission (12) from a previously set value to a raised value in response to actuation of the brake control (21) during a first period which terminates either when the brake control has been released or when the speed of the motor of the vehicle exceeds a speed value specified by a predetermined characteristic curve with reference to the transmission output speed, whichever occurs first, the gear ratio being raised during said first period by an amount limited only by the available gear ratio range, reaching of said specified speed value, and the available time for raising said ratio prior to release of said brake pedal and
    after the termination of said first period maintaining the gear ratio which is in use at the end of said first period for the duration of a second period which terminates with the next actuation of the acceleration control (20) of the vehicle, after which the normal control of the transmission of the vehicle is restored.

2. A method of controlling an automatic transmission of a motor vehicle with respect to operation of the vehicle brake control in which the gear ratio of the automatic transmission is raised to improve braking, comprising the steps of:
    raising the gear step-down ratio of the transmission from a previously-set value to a raised value in response to actuation of the brake control (21) during a first period which terminates when either the brake control has been released or the speed of the motor of the vehicle has exceeded a speed value specified by a predetermined characteristic curve with reference to the transmission output speed, whichever occurs first, the gear ratio being raised during said first period by an amount limited only by the available gear ratio range, reaching of said specified speed value, and the available time for raising said ratio prior to release of said brake pedal and
    then storing a value representing the speed of the vehicle at the termination of said first period and simultaneously transferring the control of the transmission to a controller responsive to differences in vehicle speed from the stored vehicle speed, for action tending to keep that difference small and to maintain the vehicle speed at the stored value for the duration of a second period which terminates with the next actuation of the acceleration control (21) of the vehicle, after which the normal control of the transmission of the vehicle is restored.

3. A method as defined in claim 1 or claim 2 in which at the close of said second period, if the actuation of said acceleration control does not reach a predetermined threshold value (L2), instead of the restoration of the normal control of the transmission, there is produced a diminuation in part of the increment of gear ratio that was produced in response to actuation of the brake control and the gear ratio as so diminished is then maintained until the acceleration control of the vehicle is actuated to an extend exceeding said threshold value (L2).

4. A method as defined in claim 1 or claim 2 in which said second period terminates on the first actuation of said accelerator control which exceeds a predetermined actuation threshold.

* * * * *